(12) United States Patent
Brady et al.

(10) Patent No.: US 7,007,054 B1
(45) Date of Patent: *Feb. 28, 2006

(54) FASTER DISCRETE COSINE TRANSFORMS USING SCALED TERMS

(75) Inventors: Michael Thomas Brady, Longmont, CO (US); Jennifer Quirin Trelewicz, Superior, CO (US); Joan LaVerne Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/694,452

(22) Filed: Oct. 23, 2000

(51) Int. Cl.
*G06F 17/14* (2006.01)

(52) U.S. Cl. ..................................... 708/402

(58) Field of Classification Search ............... 708/400, 708/401, 402, 403, 404, 405, 406
See application file for complete search history.

(56) References Cited

U.S. PATENT DOCUMENTS

| | | | |
|---|---|---|---|
| 4,837,724 A | 6/1989 | Borgers et al. | |
| 4,860,097 A | 8/1989 | Hartnack et al. | |
| 5,301,242 A | 4/1994 | Gonzales et al. | |
| 5,379,122 A | 1/1995 | Eschbach | |
| 5,528,533 A | 6/1996 | Kitaura et al. | |
| 5,533,052 A | 7/1996 | Bhaskar | |
| 5,539,836 A | 7/1996 | Babkin | |
| 5,642,438 A | 6/1997 | Babkin | |
| 5,649,077 A | 7/1997 | On et al. | |
| H1684 H | 10/1997 | De Queiroz et al. | |
| 5,701,263 A * | 12/1997 | Pineda | 708/402 |
| 5,781,239 A * | 7/1998 | Mattela et al. | 348/415 |
| 5,790,775 A | 8/1998 | Marks et al. | |
| 5,805,482 A | 9/1998 | Phillips | |
| 5,822,003 A | 10/1998 | Girod et al. | |
| 5,822,484 A | 10/1998 | Arroyo | |
| 5,854,757 A * | 12/1998 | Dierke | 708/402 |
| 5,867,601 A | 2/1999 | Phillips | |
| 6,002,809 A | 12/1999 | Feig et al. | |
| 6,009,207 A | 12/1999 | Chen | |
| 6,044,176 A | 3/2000 | Kim et al. | |
| 6,067,384 A | 5/2000 | Manickam et al. | |
| 6,073,218 A | 6/2000 | DeKoning et al. | |
| 6,092,920 A | 7/2000 | Sakamoto | |
| 6,097,846 A | 8/2000 | Abe | |
| 6,112,219 A | 8/2000 | Girod et al. | |
| 6,115,772 A | 9/2000 | Crater | |

FOREIGN PATENT DOCUMENTS

JP    11-215499    8/1999

* cited by examiner

*Primary Examiner*—Chuong D. Ngo
(74) *Attorney, Agent, or Firm*—Chambliss, Bahner & Stophel, P.C.; David W. Lynch

(57) ABSTRACT

Faster discrete cosine transforms that use scaled terms are disclosed. Prior to application of a transform, equations are arranged into collections. Each collection is scaled by dividing each of the discrete cosine transform constants in the collection by one of the discrete cosine transform constants from the collection. Each of the scaled discrete cosine transform constants are then represented with approximated sums of powers-of-2. During the execution phase the block of input data is obtained. A series of predetermined sums and shifts is performed on the data. The output results are saved.

44 Claims, 7 Drawing Sheets

300
310 — Actual
$C_2/C_6 = 2.414214$
$C_6/C_6 = 1.000000$
$C_2/C_2 = 1.000000$
$C_6/C_2 = 0.414214$ 312
Estimate
$2.4 = 12/5$
1
1
$0.416416 = 5/12$ 314
Error
0.5%
0.0%
0.0%
0.5%

| Actual | Estimate | Error |
|---|---|---|
| C1/C5 = 1.765367 | 1.75(1 + 1/2 + 1/4) | 0.87% |
| C3/C5 = 1.496606 | 1.5(1 + 1/2) | 0.23% |
| C5/C5 = 1 | 1 | 0.00% |
| C7/C5 = 0.351153 | (3/2)>>2 − (7/4)>>6 | 0.99% |

| Actual | Estimate | Error |
|---|---|---|
| C1/C7 = 5.027339 | 5(4+1) | 0.54% |
| C3/C7 = 4.261973 | 4.25 ( 4 + 1/4 ) | 0.28% |
| C5/C7 = 2.847759 | 2.875 ( 4 − 1 − 1/8) | 0.95% |
| C7/C7 = 1 | 1 | 0.00% |

| Actual | Estimate | Error |
|---|---|---|
| C1 = 0.980785 | 0.984375 (1 . 1/64) | 0.366% |
| C2 = 0.923880 | 0.929687 (1.1/16.1/128) | 0.628% |
| C3 = 0.831470 | 0.828125 (1−1/8−1/32−1/64) | 0.402% |
| C5 = 0.555570 | 0.554687 (1/2+1/32+1/64+1/128) | 0.158% |
| C6 = 0.382683 | 0.378906 (1/4+1/8+1/256) | 0.987% |
| C7 = 0.195090 | 0.193359 (1/8+1/16+1/256+1/512) | 0.887% |

Fig. 7

FASTER DISCRETE COSINE TRANSFORMS USING SCALED TERMS

CROSS-REFERENCE TO RELATED APPLICATION

This application is related to the following co-pending and commonly-assigned patent applications, which are hereby incorporated herein by reference in their respective entirety:

"FASTER TRANSFORMS USING SCALED TERMS" to Trelewicz et. al., application Ser. No. 09/694,448, filed on Oct. 23, 2000, now U.S. Pat. No. 6,766,341.

"FASTER TRANSFORMS USING EARLY ABORTS AND PRECISION REFINEMENTS" to Mitchell et al., application Ser. No. 09/694,455, filed on Sep. 23, 2000.

BACKGROUND OF THE INVENTION

1. Field of the Invention

This invention relates in general to data processing, and more particularly to faster discrete cosine transforms using scaled terms.

2. Description of Related Art

Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real-time and/or fast execution.

Data compression is desirable in many data handling processes, where too much data is present for practical applications using the data. Commonly, compression is used in communication links, to reduce transmission time or required bandwidth. Similarly, compression is preferred in data storage systems, including digital printers and copiers, where "pages" of a document to be printed may be stored temporarily in memory. Here the amount of media space can be substantially reduced with compression. Generally speaking, scanned images, i.e., electronic representations of hard copy documents, are often large, and thus make desirable candidates for compression.

It is well-known in the art to use a discrete cosine transform for data compression. In particular examples referred to herein, the terms images and image processing will be used. However, those skilled in the art will recognize that the present invention is not meant to be limited to processing images but is applicable to processing different data, such as audio data, scientific data, image data, etc.

In combination with other techniques, such as color subsampling, quantization, Huffman coding and run-length coding, the discrete cosine transform can compress a digital color image by a factor of approximately thirty to one with virtually no noticeable image degradation. Because of its usefulness in data compression, the discrete cosine transform is an integral part of several data compression standards used by international standards committees such as the International Standards Organization.

DCT (Discrete Cosine Transform), disseminated by the JPEG committee, is a lossy compression system which reduces data redundancies based on pixel to pixel correlations. Generally, an image does not change very much on a pixel to pixel basis and therefore has what is known as "natural spatial correlation". In natural scenes, correlation is generalized, but not exact. Noise makes each pixel somewhat different from its neighbors. Moreover, signal and data processing frequently needs to convert the input data into transform coefficients for the purposes of analysis. Often only a quantized version of the coefficients are needed (e.g., JPEG/MPEG data compression or audio/voice compression). Many such applications need to be done fast in real time such as the generation of JPEG data for high speed printers.

Generally, an example of a JPEG DCT compression and decompression system may be had by referencing the Encyclopedia of Graphics File Formats, by J. D. Murray and W. vanRyper, pp. 159–171 (1994, O'Reilly & Associates, Inc.). Further description of the draft JPEG standard may be found, for example, in "JPEG Still Image Data Compression Standard," by W. Pennebaker and J. Mitchell, 1993 (Van Nostrand Reinhold, New York) or "Discrete Cosine Transform: Algorithms, Advantages and Applications," by K. Rao and P. Yip, 1990 (Academic Press, San Diego).

The two-dimensional discrete cosine transform is a pair of mathematical equations that transforms one $N_1 \times N_2$ array of numbers to or from another $N_1 \times N_2$ array of numbers. The first array typically represents a square $N \times N$ array of spatially determined pixel values which form the digital image. The second array is an array of discrete cosine transform coefficients which represent the image in the frequency domain. This method of representing the image by the coefficients of its frequency components is a special case of the discrete Fourier transform. The discrete Fourier transform is the discrete version of the classic mathematical Fourier transform wherein any periodic waveform may be expressed as a sum of sine and cosine waves of different frequencies and amplitudes. The discrete cosine transform, like the Fourier transform, is thus a transform which transforms a signal from the time domain into the frequency domain and vice versa. With an input image, A, the coefficients for the output "image," B, are:

$$B(k_1, k_2) = \sum_{i=0}^{N_1-1} \sum_{j=0}^{N_2-1} 4A(i, j) \cos\left[\frac{\pi k_1}{2N_1}(2i+1)\right] \cos\left[\frac{\pi k_2}{2N_2}(2j+1)\right]$$

For an image, the input is $N_2$ pixels wide by $N_1$ pixels high; $A(i, j)$ is the intensity of the pixel in row i and column j; $B(k_1, k_2)$ is the DCT coefficient in row $k_1$ and column $k_2$ of the DCT matrix. All DCT multiplications are real. This lowers the number of required multiplications, as compared to the discrete Fourier transform. For most images, much of the signal energy lies at low frequencies; these appear in the upper left corner of the DCT. The lower right values represent higher frequencies, and are often small enough to be neglected with little visible distortion.

There are two basic discrete cosine transform equations. The first basic equation is the forward discrete cosine transform which transforms the pixel values into the discrete cosine transform coefficients. The second basic equation is the inverse discrete cosine transform which transforms the discrete cosine transform coefficients back into pixel values. Most applications of the discrete cosine transform for images use eight-by-eight arrays wherein N therefore has a value of eight. Assuming then that N has the value of eight when performing the transforms, where $f(i, j)$ are the values of the pixel array and $F(u, v)$ are the values of the discrete cosine transform coefficients, the equations of the discrete cosine transforms are as follows.

The formula for the 2D discrete cosine transform is given by:

$$F(u, v) = \frac{C_u C_v}{4} \sum_{x=0}^{7} \sum_{y=0}^{7} f(x, y) \cos\left(\frac{(2x+1)u\pi}{16}\right) \cos\left(\frac{(2y+1)v\pi}{16}\right)$$

where x, y=spatial coordinates in the spatial domain (0, 1, 2, ... 7); u, v=coordinates in the transform domain (0, 1, 2, ... 7);

$$C_u = \frac{1}{\sqrt{2}} \text{ for } u = 0,$$

otherwise 1; and $$C_v = \frac{1}{\sqrt{2}} \text{ for } v = 0,$$

otherwise 1. The separable nature of the 2D DCT is exploited by performing a 1D DCT on the eight columns, and then a 1D DCT on the eight rows of the result. Several fast algorithms are available to calculate the 8-point 1D DCT.

As described above, a DCT compressor comprises mainly two parts. The first part transforms highly correlated image data into weakly correlated coefficients using a DCT transform and the second part performs quantization on coefficients to reduce the bit rate for transmission or storage. However, the computational burden in performing a DCT is demanding. For example, to process a one-dimensional DCT of length 8 pixels requires 13 multiplications and 29 additions in currently known fast algorithms. As stated above, the image is divided into square blocks of size 8 by 8 pixels, 16 by 16 pixels or 32 by 32 pixels. Each block is often processed by the one-dimensional DCT in row-by-row fashion followed by column-by-column. On the other hand, different block sizes are selected for compression due to different types of input and different quality requirements on the decompressed data.

In the article, "A Fast DCT-SQ Scheme for Images," Trans. IEICE, Vol. E-71, No. 11, pp. 1095–1097, November 1988, Y. Arai, T. Agui, and M. Nakajima proposed that many of the DCT multiplications can be formulated as scaling multipliers to the DCT coefficients. The DCT after the multipliers are factored out is called the scaled DCT. The scaled DCT is still orthogonal but no longer normalized, whereas the scaling factors may be restored in a subsequent quantization process. Arai, et al. have demonstrated in their article that only 5 multiplications and 29 additions are required in processing an 8-point scaled DCT.

However, there is a need to further increase the speed of the encoder because more than half of the time in the JPEG encoder is spent in the Forward Discrete Cosine Transform (FDCT) code calculating the two-dimensional (2-D) 8×8 block of 8-bit or 12-bit samples. Currently, the 2-D FDCT is calculated by first calculating eight 1-D horizontal DCTs and then calculating another eight 1-D vertical DCTs using the currently fastest known 1-D DCT, which was first described by Arai, Agui, and Nakajima, as mentioned above. The current process takes 29 additions and 5 multiplication to calculate a scaled version of the 1-D FDCT. The scaling constants are the same for each vertical column and can finally be included in the quantization step. This prior solution saved eight multiplications per 1-D FDCT. However, as stated above, it can be seen that there is a need to provide a faster DCT transform.

It can also be seen that there is a need to provide a method and apparatus for performing discrete cosine transforms with less addition and multiplication steps to increase throughput of an encoder.

SUMMARY OF THE INVENTION

To overcome the limitations in the prior art described above, and to overcome other limitations that will become apparent upon reading and understanding the present specification, the present invention discloses a faster discrete cosine transform that uses scaled terms.

The present invention solves the above-described problems by decreasing the number of multiplications by using scaling terms on the transform constants. Further, after scaling, the terms of the constants are replaced by a series of fewer linear shifts and additions since the constants may be approximated by sums of powers-of-2 after only a few summations. Those skilled in the art will recognize that throughout this specification, the term "matrix" is used in both its traditional mathematical sense and also to cover all hardware and software systems which when analyzed could be equivalently represented as a mathematical matrix.

A method in accordance with the principles of the present invention includes arranging discrete cosine transform equations into at least one collection having at least two discrete cosine transform constants, scaling the discrete cosine transform equations in the at least one collection by dividing each of the discrete cosine transform constants in the collection by one of the discrete cosine transform constants from the at least one collection and representing each of the scaled discrete cosine transform constants with estimated scaled discrete cosine transform constants approximated by sums of powers-of-2.

Other embodiments of a method in accordance with the principles of the invention may include alternative or optional additional aspects. One such aspect of the present invention is that the method further includes separating an image into at least one block and transforming the block into transformed data by performing matrix multiplication on the discrete cosine transform equations based upon binary arithmetic using the estimated scaled discrete cosine transform constants and performing linear shifts and additions.

Another aspect of the present invention is that the scaling the discrete cosine transform equations in the at least one collection by dividing each of the discrete cosine transform constants in the at least one collection by one of the discrete cosine transform constants from the at least one collection saves multiplications.

Another aspect of the present invention is that the discrete cosine transform constant chosen for scaling the discrete cosine transform equations in the at least one collection is selected according to a predetermined cost function.

Another aspect of the present invention is that the cost function minimizes a number of add operations.

Another aspect of the present invention is that the cost function minimizes a worst case number of add operations.

Another aspect of the present invention is that the cost function minimizes an error per constant resulting from the approximations.

Another aspect of the present invention is that the transforming the block into transformed data further comprises generating at least one set of one dimensional discrete cosine transform equations.

Another aspect of the present invention is that the discrete cosine transform constants are obtained by splitting the discrete cosine transform constants into even and odd terms by obtaining sums and differences of input samples.

Another aspect of the present invention is that the block is an $N_1 \times N_2$ block.

Another aspect of the present invention is that $N_1=N_2=8$.

In another embodiment of the present invention, a data compression system is provided. The data compression system includes a discrete cosine transformer for applying a discrete cosine transform to decorrelate data into discrete cosine transform equations, the discrete cosine transform equations having been formed by arranging the discrete cosine transform equations into at least one collection having at least two discrete cosine transform constants, scaling the discrete cosine transform equations in the at least one collection by dividing each of the discrete cosine transform constant in the collection by one of the discrete cosine transform constants from the at least one collection and representing each of the scaled discrete cosine transform constants with estimated scaled discrete cosine transform constants approximated by sums of powers-of-2 and a quantizer for quantizing the transformed data into quantized data to reduce the number of bits needed to represent the transform coefficients.

In another embodiment of the present invention, a printer is provided. The printer includes a memory for storing data, a processor for processing the data to provide a compressed print stream output and a printhead driving circuit for controlling a printhead to generate a printout of the data, wherein the processor applies a discrete cosine transform to decorrelate data into transform coefficients using discrete cosine equations, the discrete cosine transform equations having been formed by arranging the discrete cosine transform equations into at least one collection having at least two discrete cosine transform constants, scaling the discrete cosine transform equations in the at least one collection by dividing each of the discrete cosine transform constant in the collection by one of the discrete cosine transform constants from the at least one collection and representing each of the scaled discrete cosine transform constants with estimated scaled discrete cosine transform constants approximated by sums of powers-of-2.

In another embodiment of the present invention, an article of manufacture is provided. The article of manufacture includes a program storage medium readable by a computer, the medium tangibly embodying one or more programs of instructions executable by the computer to perform a method for performing faster discrete cosine transform, the method includes arranging discrete cosine transform equations into at least one collection having at least two discrete cosine transform constants, scaling the discrete cosine transform equations in the at least one collection by dividing each of the discrete cosine transform constant in the collection by one of the discrete cosine transform constants from the at least one collection and representing each of the scaled discrete cosine transform constants with estimated scaled discrete cosine transform constants approximated by sums of powers-of-2.

In another embodiment of the present invention, a data analysis system is provided. The data analysis system includes a memory for storing the discrete cosine transform equations having been formed by arranging the discrete cosine transform equations into at least one collection having at least two discrete cosine transform constants, scaling the discrete cosine transform equations in the at least one collection by dividing each of the discrete cosine transform constant in the collection by one of the discrete cosine transform constants from the at least one collection and representing each of the scaled discrete cosine transform constants with estimated scaled discrete cosine transform constants approximated by sums of powers-of-2 and a transformer for applying the transform equations to perform a discrete cosine transform to decorrelate data into discrete cosine transform coefficients.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a table that shows the terms C2 and C6;

FIG. 3 is a table that shows the actual values if either C2 or C6 is used to scale the coefficient matrix and the estimates are a ratio of integers;

FIG. 4 shows all possible combinations of dividing the coefficient matrix by C1, C3, C5, and C7;

FIG. 5 shows the actual values when C5 is used to scale the coefficient matrix;

FIG. 6 shows the actual values when C7 is used to scale the coefficient matrix;

FIG. 7 shows the number of binary adds to generate the unscaled cosine terms within one percent error;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a faster discrete cosine transform that uses scaled terms. The present invention decreases the number of multiplications by using scaled terms for the transform constants. Further, after scaling, the ratios of the constants are replaced by a series of linear shifts and additions since the constants may be approximated by sums of powers-of-2 after only a few summations.

Figure 1:
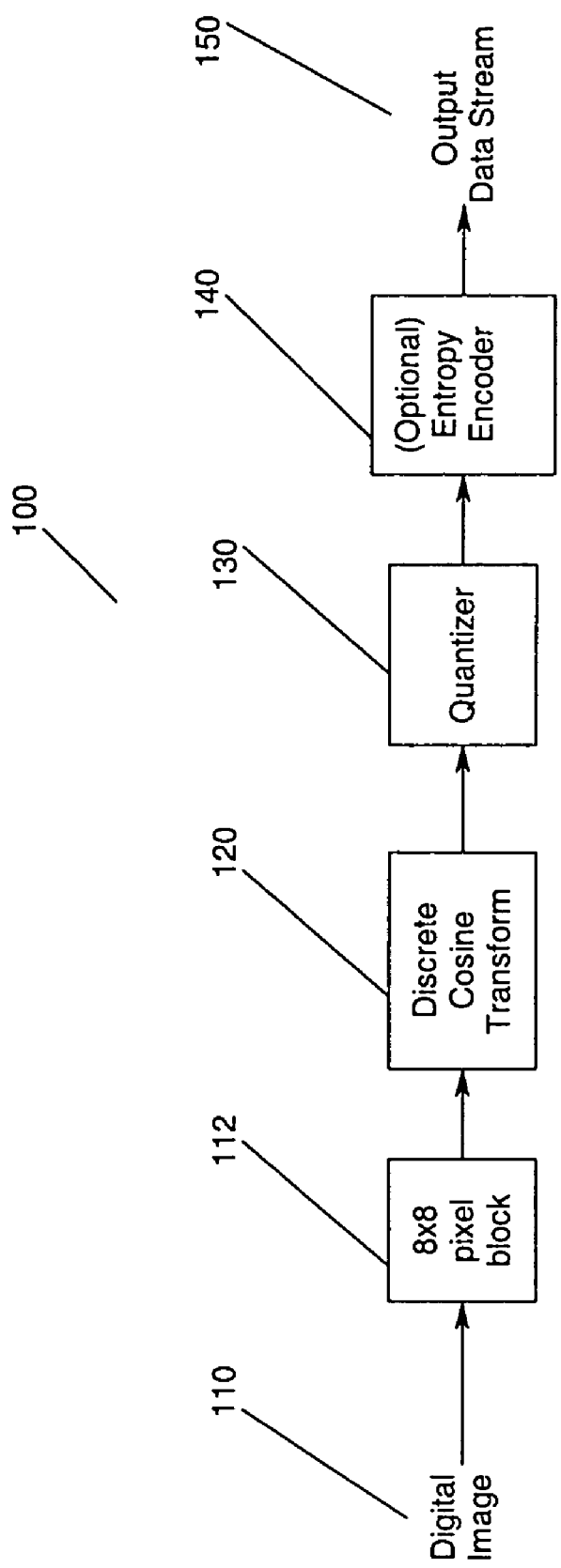
FIG. 1 illustrates a block diagram of a JPEG encoder.

FIG. 1 illustrates a block diagram of a JPEG encoder 100. In FIG. 1, digital image data 110 is divided up into 8 by 8 pixel blocks 112. Then, the discrete cosine transform (DCT) of each block is calculated 120. The discrete cosine transform (DCT) helps separate the data into parts (or spectral sub-bands) of differing importance (e.g., with respect to an image's visual quality). The DCT is similar to the discrete Fourier transform: it transforms a signal from the spatial domain to the frequency domain.

A quantizer 130 rounds off the DCT coefficients according to the quantization matrix. This step produces the "lossy" nature of JPEG, but allows for large compression ratios. There is a tradeoff between image quality and degree of quantization. A large quantization step size can produce unacceptably large image distortion. This effect is similar to quantizing Fourier series coefficients too coarsely; large distortion would result. Unfortunately, finer quantization leads to lower compression ratios. The question is how to quantize the DCT coefficients most efficiently. Because of human eyesight's natural high frequency roll-off, these frequencies play a less important role than low frequencies. This lets JPEG use a much higher step size for the high frequency coefficients, with little noticeable image deterioration. The quantizer coefficient output may then be encoded by an optional entropy encoder 140 to produce a compressed data stream 150 to an output file. Note that for JPEG the entropy encoder is not optional, but other similar data compression systems could be designed without the CPU cycles required by the entropy encoder.

However, as described below, there is a need to provide a method and apparatus for performing discrete cosine transforms with less multiplication steps to increase throughput of the encoder 100. As will be described, the method according to the present invention saves multiplications in the brute force equations by scaling the coefficient matrix. Each separable subgroup is scaled independently of the other collections. Within each collection, the remaining multiplications are replaced by simple shifts and adds. The scaling terms are chosen according to various cost functions. The preferred embodiment uses cost functions that minimize the number of adds and that minimize the worst case number of adds. However, those skilled in the art will recognize that alternate cost functions could choose how much error is allowed per coefficient. Moreover, those skilled in the art will recognize that the inverse DCT (IDCT) can be implemented using the same method so that the same number of operations are used.

Let the Cn=cosine (n*π/16). Let f(x) for x=0 to 7 be the input samples. Let F(u) for u=0 to 7 be proportional to the 1-D transform coefficients. Let S(u) for u=0 to 7 be equal to the 1-D transform coefficients. Let sxy be f(x)+f(y) and dxy be f(x)−f(y) for x, y=0 to 7. Note the calculations for F(u) below ignore some constants that end up in the quantization terms. The first step in the 1-D DCT is to split the coefficients into the even and odd terms by taking sums and differences of the eight input samples.

$$
\begin{aligned}
s07 &= f(0) + f(7) \\
s16 &= f(1) + f(6) \\
s25 &= f(2) + f(5) \\
s34 &= f(3) + f(4) \\
d07 &= f(0) - f(7) \\
d16 &= f(1) - f(6) \\
d25 &= f(2) - f(5) \\
d34 &= f(3) - f(4)
\end{aligned}
$$

Then, the sums and differences of the sums are calculated:

$$
\begin{aligned}
s0734 &= s07 + s34 \\
s1625 &= s16 + s25 \\
d0734 &= s07 - s34 \\
d1625 &= s16 - s25
\end{aligned}
$$

Finally we take sums and differences of the sums again to calculate F(0) and F(4).

$$
\begin{aligned}
F(0) &= s0734 + s1625 \\
F(4) &= s0734 - s1625 \\
2*S(0) &= C4(s0734 + s1625) \\
2*S(4) &= C4(s0734 - s1625)
\end{aligned}
$$

Those skilled in the art will recognize that the equations above have been derived similar to the Arai, Agui, and Nakajima algorithm. The F(2) and F(6) can be calculated from these terms as:

$$
\begin{aligned}
F(2) &= C2 * d0734 + C6 * d1625 \\
F(6) &= C6 * d0734 - C2 * d1625 \\
2*S(2) &= C2 * d0734 + C6 * d1625 \\
2*S(6) &= C6 * d0734 - C2 * d1625
\end{aligned}
$$

FIG. 2 illustrates a table 200 that shows the C2 and C6 terms divided by C2 or C6. C2 is equal to 0.923880, C2/C2 is equal to 1.000000, C2/C6 is equal to $1+\sqrt{2}$, C6 is equal to 0.382683, C6/C2 is equal to $$\frac{1}{1+\sqrt{2}},$$

and C6/C6 is equal to 1.000000. Next, the utility of scaling the constants in the matrix by C6 or C2 is investigated.

FIG. 3 is a table 300 that shows the actual values 310 if either C2 or C6 is used to scale the constants in the matrix and the estimates 312 are a ratio of integers. FIG. 3 shows the error 314 due to each of the approximations. C2 was chosen because the greatest error occurs in the harmonic with the least power (or the smallest contribution to the overall output).

Since F(2) is much more likely to occur, it is now exactly calculated. So the equations become:

F(2)=12*d0734+5*d1625=d1625+(d0734+d1625+(d0734<<1))<<2

F(6)=5*d0734−12*d1625=d0734+(d0734−d1625−(d1625<<1))<<2

(24/C2)*S(2)=d1625+(d0734+d1625+(d0734<<1))<<2

(24/C2)*S(6)=d0734+(d0734−d1625−(d1625<<1))<<2

Equation 1 shows the remaining equations for the odd constants expressed in matrix notation.

$$\begin{bmatrix} F(1) \\ F(3) \\ F(5) \\ F(7) \end{bmatrix} = \begin{bmatrix} +C1 & +C3 & +C5 & +C7 \\ +C3 & -C7 & -C1 & -C5 \\ +C5 & -C1 & +C7 & +C3 \\ +C7 & -C5 & +C3 & -C1 \end{bmatrix} \begin{bmatrix} d07 \\ d16 \\ d25 \\ d34 \end{bmatrix} \quad \text{Equation 1}$$

In Equation 1, F(1), F(3), F(5) and F(7) are a vector related to unquantized 1-D DCT transform coefficients. Note: for u=(1, 3, 5, 7), 2*S(u)=F(u). If the solutions for these four coefficients are found using a "brute force" approach, then 12 additional additions and 16 multiplications would be necessary. However, if the matrix of coefficients is divided by one of the constants in the matrix, then the number of multiplications necessary is reduced by four. This linear system is shown in Equation 2 below.

$$\frac{1}{C5} * \begin{bmatrix} F(1) \\ F(3) \\ F(5) \\ F(7) \end{bmatrix} = \quad \text{Equation 2}$$

$$\begin{bmatrix} +C1/C5 & +C3/C5 & +1 & +C7/C5 \\ +C3/C5 & -C7/C5 & -C1/C5 & -1 \\ +1 & -C1/C5 & +C7/C5 & +C3/C5 \\ +C7/C5 & -1 & +C3/C5 & -C1/C5 \end{bmatrix} \begin{bmatrix} d07 \\ d16 \\ d25 \\ d34 \end{bmatrix}$$

Equation 2 shows that the linear set now only involves 12 additions, 12 multiplications and one division. However, the constant C5 in the division can be included in the quantization numbers once per image. Meanwhile, the benefits of only 12 multiplications instead of 16 are reaped every 8 by 8 block of samples. Furthermore, when the constants of the matrix were scaled by one of the terms, all of the terms became approximations of sums of powers-of-2 within a few successive approximations. This is very beneficial because a multiplication which normally is considered to necessitate more than 5 CPU cycles now becomes a shift and add with a maximum of 3 shifts and 2 additions. FIG. 4 shows all possible combinations of dividing the constants in the matrix by C1, C3. C5, and C7.

Below, the utility of scaling the constants in the matrix by C5 or by C7 is investigated. FIG. 5 is a table 500 showing the actual values 510 if C5 is used to scale the constants of the matrix. The estimates 512 are in sums of powers-of-2, and the error 514 due to the approximation is also stated. C5 was chosen because of the continuity in the terms. It was also chosen because the greatest error occurs in the harmonic with the least power (or the smallest contribution to the overall output). The constant C7 is also a good candidate because the calculations fit inside of 16 bits. This optimization is shown in table 600 of FIG. 6.

Those skilled in the art will recognize the above scaling is not meant to be an optimal solution for minimizing error. Nevertheless, an exhaustive search may be performed to find the optimal number to scale the matrix. Also, the scaling factor need not be a function of cos(n*π/16). As shown for the C2 and C6 cases, the best answer was a ratio of integers. For comparison purposes, FIG. 7 is a table 700 showing the number of binary adds and used to calculate the unscaled cosine terms within one percent error.

In summary, the scaled terms approach fundamentally decreases the number of multiplications because the scaling on the quantization values is done once per image. However, the benefits are reaped every 8×8 block, or more generally, $N_1 \times N_2$ block. Second, after scaling, the ratios of coefficients are very nearly sums of powers-of-2 after only a few summations. Thus, multiplications can be replaced by a series of linear shifts and additions. In some cases, these terms may be further converted into integer terms. This will provide superior hardware and very fast software on machines where multiplications are costly (in terms of CPU cycles).

Figure 8:
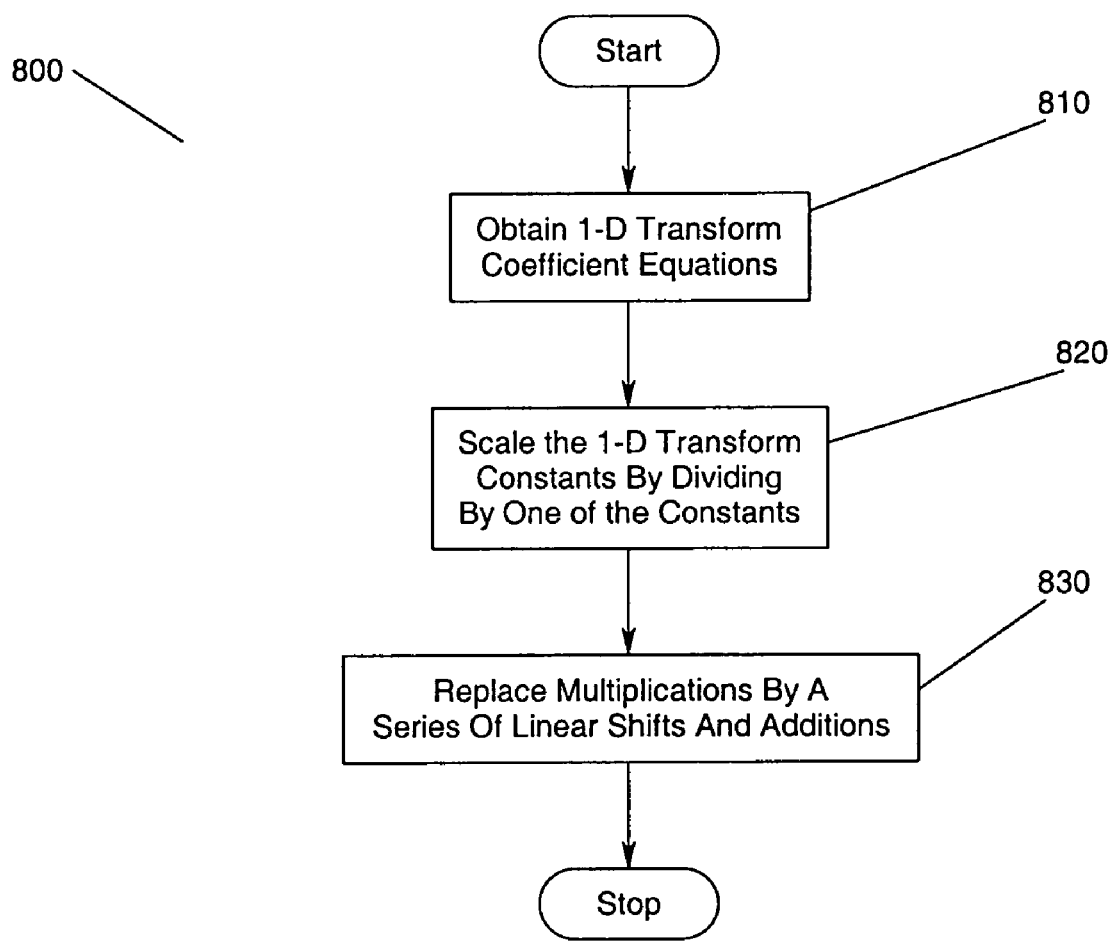
FIG. 8 illustrates a flow chart of the method to design the fast DCT using scaled terms according to the present invention.

FIG. 8 illustrates a flow chart 800 of the method used to design the fast DCT method using scaled terms according to the present invention. In FIG. 8, the one dimensional transform coefficients equations for the DCTs are obtained 810. To obtain the coefficients, the coefficients are split into even and odd terms by obtaining sums and differences with the eight input samples, which are then used to calculate the one dimensional transform coefficients.

After the one dimensional coefficients are obtained, the constants in the 1-D transform matrix are scaled by dividing by one of the constants 820. This reduces the number of multiplications, for an 8×8 block, by four. After scaling, the ratios of constants are very nearly sums of powers-of-2 after only a few summations Thus, multiplications can be replaced by a series of linear shifts and additions 830.

Figure 9:
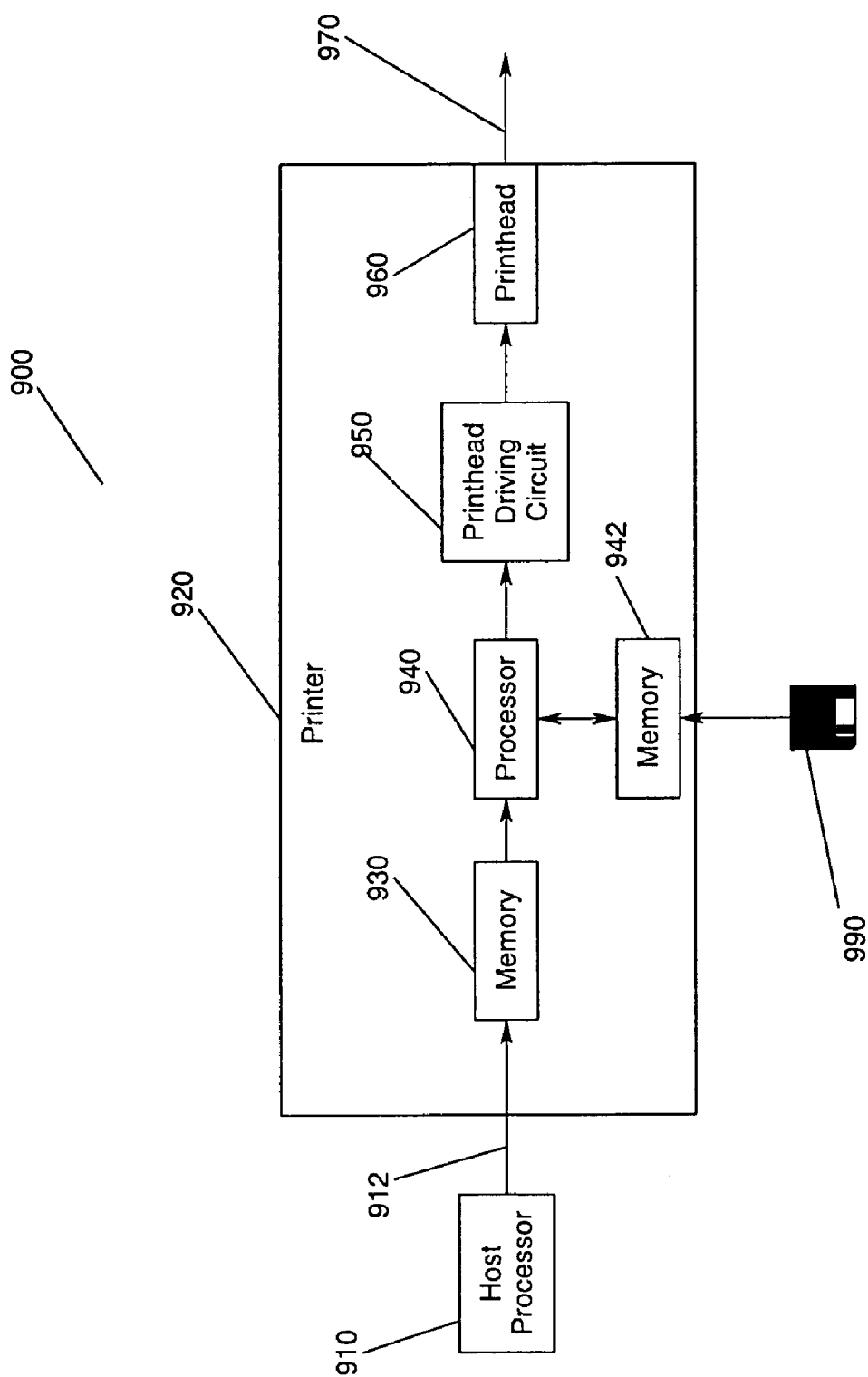
FIG. 9 illustrates a printer according to the present invention.

FIG. 9 illustrates a block diagram 900 of a printer 920 according to the present invention. In FIG. 9, the printer 920 receives data 912 from a host processor 910. The data 912 is provided into memory 930 where the data 912 may be arranged into blocks. The blocks are then processed by a processor 940, such as a raster image processor. The processor 940 provides a compressed print stream representing the data to a printhead driving circuit 950. The printhead driving circuit 950 then controls the printhead 960 to generate a printout 970 of the data.

The algorithm designed with reference to FIG. 8 may be tangibly embodied in a computer-readable medium or carrier 990, e.g. one or more of the fixed and/or removable data storage devices illustrated in FIG. 9, or other data storage or data communications devices. The computer program may be loaded into the memory 942 to configure the processor 940 of FIG. 9, for execution. The computer program comprise instructions which, when read and executed by the processor 940 of FIG. 9, causes the processor 940 to perform the steps necessary to execute the steps or elements of the present invention.

Figure 10:
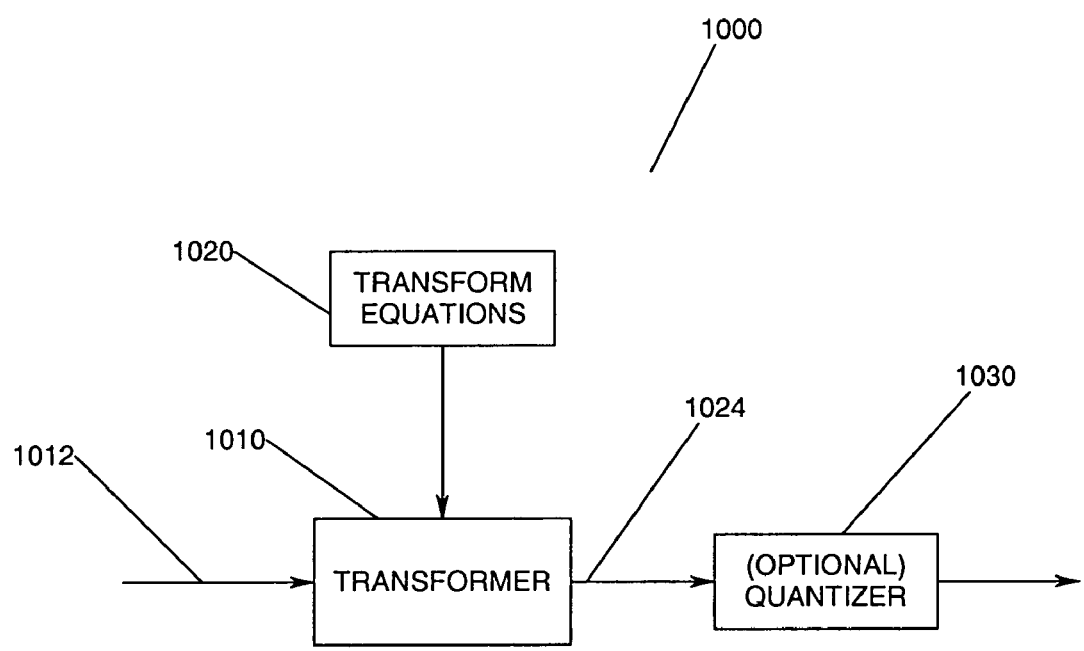
FIG. 10 illustrates a data analyzing system according to the present invention.

FIG. 10 illustrates a data analyzing system 1000 according to the present invention. In FIG. 10, a discrete cosine transform 1010 receives a block of data 1012 to be analyzed. The discrete cosine transform 1010 uses discrete cosine transform equations 1020 to generate transformed data 1024. Prior to execution, the discrete cosine transform equations 1020 are split into at least one sub-transform having at least two transform constants. The at least two transform constants for each collection are independently scaled with a scaling term to maintain a substantially uniform ratio between the at least two transform constants within the at least one collection, wherein the scaling term is chosen according to a predetermined cost function. The discrete cosine transformed data 1024 may then be quantized by an optional quantizer 1030.

Figure 11:
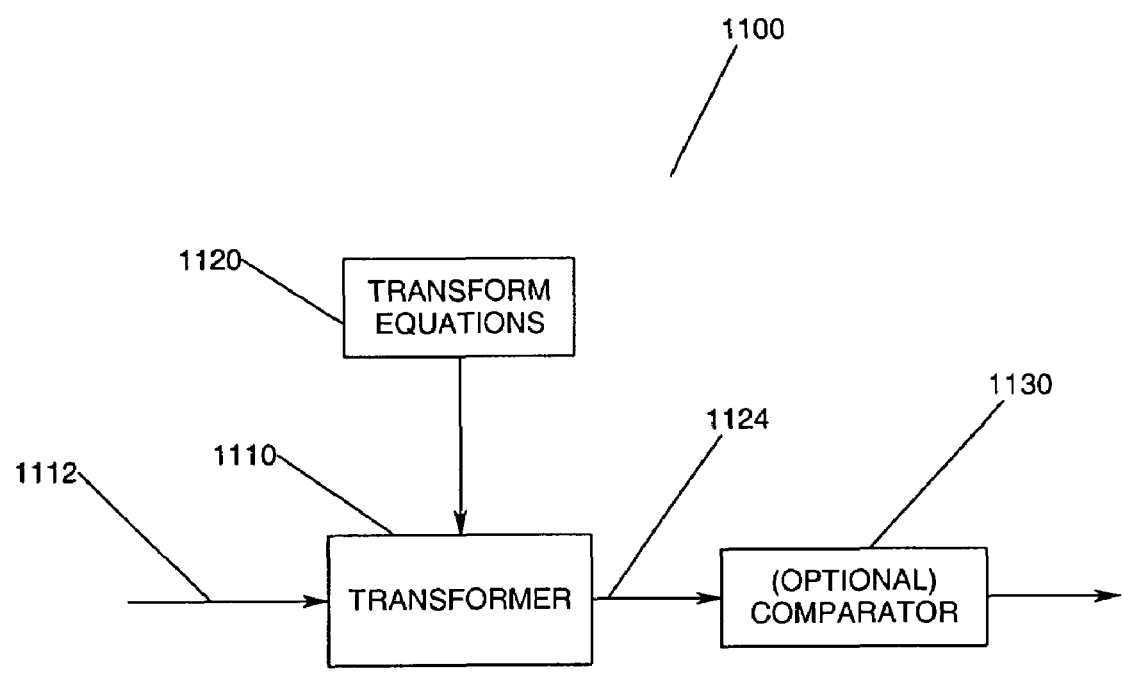
FIG. 11 illustrates another data analyzing system according to the present invention.

FIG. 11 illustrates another data analyzing system 1100 according to the present invention. In FIG. 11, a discrete cosine transform 1110 receives a block of data 1112 to be analyzed. The discrete cosine transform 1110 uses discrete cosine transform equations 1120 to generate transformed data 1124. Prior to execution, the discrete cosine transform equations 1120 are split into at least one sub-transform having at least two transform constants. The at least two transform constants for each collection are independently scaled with a scaling term to maintain a substantially uniform ratio between the at least two transform constants within the at least one collection, wherein the scaling term may be chosen according to a predetermined cost function. The discrete cosine transformed data 1124 may then be compared to scaled comparison values in an optional comparator 1130.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for generating a faster discrete cosine transform in a data compression system, comprising:
   arranging discrete cosine transform equations into collections, wherein at least one collection includes at least two discrete transform equations, and wherein the at least two discrete transform equations includes at least two discrete cosine transform constants;
   scaling the discrete cosine transform equations in a collection by dividing each of the discrete cosine transform constants in the collection by one discrete cosine transform constant from the collection;
   representing each of the scaled discrete cosine transform constants with sums of powers-of-2, wherein the sums of powers-of-2 are calculated to approximate the scaled discrete cosine transform constants; and
   compressing data using the approximated scaled discrete cosine transform constants;
   wherein the discrete cosine transform constant chosen for scaling the discrete cosine transform equations in the at least one collection is selected according to a predetermined cost function.

2. The method of claim 1 further comprising separating an image into at least one block and transforming the block into transformed data by performing matrix multiplication on the discrete cosine transform equations based upon binary arithmetic using the estimated scaled discrete cosine transform constants and performing linear shifts and additions.

3. The method of claim 2 wherein the transforming the block into transformed data further comprises using at least one set of one dimensional discrete cosine transform equations.

4. The method of claim 3 wherein the discrete cosine transform constants are obtained by splitting the discrete cosine transform constants into even and odd terms by obtaining sums and differences of input samples.

5. The method of claim 2 wherein the block is an $N_1 \times N_2$ block.

6. The method of claim 5 wherein $N_1 = N_2 = 8$.

7. The method of claim 1 wherein the scaling the discrete cosine transform equations in the at least one collection by dividing each of the discrete cosine transform constants in the at least one collection by one of the discrete cosine transform constants from the at least one collection saves multiplications.

8. The method of claim 1, wherein the cost function minimizes a number of add operations.

9. The method of claim 1, wherein the cost function minimizes a worst case number of add operations.

10. The method of claim 1, wherein the cost function minimizes an error per constant resulting from the approximations.

11. A data compression system, the data compression system comprising a discrete cosine transformer for applying a discrete cosine transform to decorrelate data into discrete cosine transform equations, the discrete cosine transform equations having been formed by arranging discrete cosine transform equations into collections, wherein at least one collection includes at least two discrete transform equations, and wherein the at least two discrete transform equations includes at least two discrete cosine transform constants, scaling the discrete cosine transform equations in a collection by dividing each of the discrete cosine transform constants in the collection by one discrete cosine transform constant from the collection and representing each of the scaled discrete cosine transform constants with sums of powers-of-2, wherein the sums of powers of-2 is calculated to approximate the scaled discrete cosine transform constants;
   wherein the discrete cosine transform constant used for scaling the discrete cosine transform equations in the at least one collection is selected according to a predetermined cost function.

12. The data compression system of claim 11 further comprising a quantizer for quantizing the transformed data into quantized data to reduce the number of bits needed to represent the transform coefficients.

13. The data compression system of claim 11 wherein the discrete cosine transformer further separates an image into at least one block and transforms the block into transformed data using the discrete cosine transform equations based upon binary arithmetic using the estimated scaled discrete cosine transform constants and performing linear shifts and additions.

14. The data compression system of claim 13 wherein the block is an $N_1 \times N_2$ block.

15. The data compression system of claim 14 wherein $N = N_2 = 8$.

16. The data compression system of claim 11 wherein the transformer executes equations that save multiplication operations, the equations having been formed by scaling the discrete cosine transform equations in the at least one collection by dividing each of the discrete cosine transform constants in the at least one collection by one of the discrete cosine transform constants from the at least one collection.

17. The data compression system of claim 11 further comprising an entropy encoder for further compressing the quantized coefficients losslessly.

18. The data compression system of claim 11, wherein the cost function minimizes a number of add operations.

19. The data compression system of claim 11, wherein the cost function minimizes a worst case number of add operations.

20. The data compression system of claim 11, wherein the cost function minimizes an error per constant resulting from the approximations.

21. The data compression system of claim 11 wherein discrete cosine transformer uses at least one set of one dimensional discrete cosine transform equations.

22. The data compression system of claim 11 wherein the equations split the discrete cosine transform coefficients into even and odd terms by obtaining sums and differences of input samples.

23. A printer, comprising:
a memory for storing data;
a processor for processing the data to provide a compressed print stream output; and
a print head driving circuit for controlling a print head to generate a printout of the data;
wherein the processor applies a discrete cosine transform to decorrelate data into transform coefficients using discrete cosine equations, the discrete cosine transform equations having been formed by arranging discrete cosine transform equations into collections, wherein at least one collection includes at least two discrete transform equations, and wherein the at least two discrete transform equations includes at least two discrete cosine transform constants, scaling the discrete cosine transform equations in a collection by dividing each of the discrete cosine transform constants in the collection by one discrete cosine transform constant from the collection and representing each of the scaled discrete cosine transform constants with sums of powers-of-2, wherein the sums of powers-of-2 is calculated to approximate the scaled discrete cosine transform constants;
wherein the discrete cosine transform constant used in scaling the discrete cosine transform equations in the at least one collection is selected according to a predetermined cost function.

24. The printer of claim 23 wherein the processor further separates an image into at least one block and transforms the block into transformed data by performing matrix multiplication on the discrete cosine transform equations based upon binary arithmetic using the estimated scaled discrete cosine transform constants and performing linear shifts and additions.

25. The printer of claim 24 wherein the block is an $N_1 \times N_2$ block.

26. The printer of claim 25 wherein $N_1=N_2=8$.

27. The printer of claim 23 wherein the processor executes equations that save multiplication operations, the equations having been formed by scaling the discrete cosine transform equations in a collection by dividing each of the discrete cosine transform constants in the at least one collection by one of the discrete cosine transform constants from the at least one collection.

28. The printer of claim 23, wherein the cost function minimizes a number of add operations.

29. The printer of claim 23, wherein the cost function minimizes a worst case number of add operations.

30. The printer of claim 23, wherein the cost function minimizes an error per constant resulting from the approximations.

31. The printer of claim 23 wherein processor uses at least one set of one dimensional discrete cosine transform equations.

32. The printer of claim 31 wherein the processor splits the discrete cosine transform coefficients into even and odd terms by obtaining sums and differences of input samples.

33. An article of manufacture comprising a program storage medium readable by a computer, the medium tangibly embodying one or more programs of instructions executable by the computer to use equations created by a method for generating faster discrete cosine transforms, the method comprising:
arranging discrete cosine transform equations into collections, wherein at least one collection includes at least two discrete transform equations, and wherein the at least two discrete transform equations includes at least two discrete cosine transform constants;
scaling the discrete cosine transform equations in a collection by dividing each of the discrete cosine transform constants in the collection by one discrete cosine transform constant from the collection; and
representing each of the scaled discrete cosine transform constants with sums of powers-of-2, wherein the sums of powers-of-2 are calculated to approximate the scaled discrete cosine transform constants;
wherein the discrete cosine transform constant chosen for scaling the discrete cosine transform equations in the at least one collection is selected according to a predetermined cost function.

34. The article of manufacture of claim 33 further comprising separating an image into at least one block and transforming the block into transformed data by using discrete cosine transform equations based upon binary arithmetic using the estimated scaled discrete cosine transform constants and performing linear shifts and additions.

35. The article of manufacture of claim 34 wherein the block is an $N_1 \times N_2$ block.

36. The article of manufacture of claim 35 wherein $N_1=N_2=8$.

37. The article of manufacture of claim 33 wherein the scaling the discrete cosine transform equations in the at least one collection by dividing each of the discrete cosine transform constants in the at least one collection by one of the discrete cosine transform constants from the at least one collection saves multiplications.

38. The article of manufacture of claim 33, wherein the cost function minimizes a number of add operations.

39. The article of manufacture of claim 33, wherein the cost function minimizes a worst case number of add operations.

40. The article of manufacture of claim 33, wherein the cost function minimizes an error per constant resulting from the approximations.

41. The article of manufacture of claim 33 wherein the transforming the block into transformed data further comprises using at least one set of one dimensional discrete cosine transform equations.

42. The article of manufacture of claim 41 wherein the discrete cosine transform constants are obtained by splitting the discrete cosine transform constants into even and odd terms by obtaining sums and differences of input samples.

43. A data analysis system, comprising;
a memory for storing discrete cosine transform equations having been formed by arranging discrete cosine transform equations into collections, wherein at least one collection includes at least two discrete transform equations, and wherein the at least two discrete transform equations includes at least two discrete cosine transform constants, scaling the discrete cosine transform equations in a collection by dividing each of the discrete cosine transform constants in the collection by one discrete cosine transform constant from the collection and representing each of the scaled discrete cosine transform constants with sums of powers-of-2, wherein the sums of powers-of-2 is calculated to approximate the scaled discrete cosine transform constants; and
a transformer for applying the transform equations to perform a discrete cosine transform to decorrelate data into discrete cosine transform coefficients;

wherein the discrete cosine transform constant used for scaling the discrete cosine transform equations in the at least one collection is selected according to a predetermined cost function.

44. The data analysis system of claim 43 wherein the transformer further separates an image into at least one block and transforms the block into transformed data by using the discrete cosine transform equations based upon binary arithmetic using the estimated scaled discrete cosine transform constants and performing linear shifts and additions.

* * * * *

UNITED STATES PATENT AND TRADEMARK OFFICE
CERTIFICATE OF CORRECTION

PATENT NO. : 7,007,054 B1
DATED : February 28, 2006
INVENTOR(S) : Brady et al.

It is certified that error appears in the above-identified patent and that said Letters Patent is hereby corrected as shown below:

<u>Column 12,</u>
Line 41, "N= =N$_2$=8" should read -- N$_1$= =N$_2$=8 --.

Signed and Sealed this

Second Day of May, 2006

JON W. DUDAS
*Director of the United States Patent and Trademark Office*